United States Patent
Condon et al.

(10) Patent No.: US 7,756,865 B2
(45) Date of Patent: Jul. 13, 2010

(54) EXTENDABLE META-DATA SUPPORT IN FINAL FORM PRESENTATION DATASTREAM PRINT ENTERPRISES

(75) Inventors: John B. Condon, Berthoud, CO (US); Reinhard H. Hohensee, Boulder, CO (US); Harry R. Lewis, Longmont, CO (US); Scott D. Mastie, Longmont, CO (US); Charles M. Sauer, Lyons, CO (US); David E. Stone, Longmont, CO (US); Howard L. Turetzky, Denver, CO (US); Douglas I. Ward, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 268 days.

(21) Appl. No.: 11/463,359

(22) Filed: Aug. 9, 2006

(65) Prior Publication Data

US 2008/0037047 A1 Feb. 14, 2008

(51) Int. Cl.
*G06F 7/00* (2006.01)
*G06F 17/30* (2006.01)
(52) U.S. Cl. .................. 707/722; 707/913; 707/917
(58) Field of Classification Search ............. 707/100
See application file for complete search history.

(56) References Cited

U.S. PATENT DOCUMENTS

| 5,592,683 | A | 1/1997 | Chen et al. | |
|---|---|---|---|---|
| 6,992,785 | B1 | 1/2006 | Chatcavage et al. | |
| 2004/0017582 | A1* | 1/2004 | Hohensee et al. | 358/1.15 |
| 2004/0021905 | A1* | 2/2004 | Holmstead et al. | 358/1.16 |
| 2005/0146744 | A1* | 7/2005 | McAllister et al. | 358/1.15 |
| 2005/0248787 | A1 | 11/2005 | Aschenbrenner et al. | |
| 2005/0273524 | A1 | 12/2005 | Aschenbrenner et al. | |
| 2006/0036934 | A1* | 2/2006 | Fujiwara | 715/500 |
| 2006/0195454 | A1* | 8/2006 | Davis et al. | 707/100 |
| 2007/0050340 | A1* | 3/2007 | von Kaenel et al. | 707/3 |
| 2007/0061382 | A1* | 3/2007 | Davis et al. | 707/201 |

OTHER PUBLICATIONS

Bird, R. et al.; *Associative/Parallel Processor for Searching Very Large Textual Data Bases;* Association for Computing Machinery Digital Library; Publication title and date unknown.

(Continued)

*Primary Examiner*—Charles Rones
*Assistant Examiner*—Kris Mackes
(74) *Attorney, Agent, or Firm*—Duft Bornsen & Fishman, LLP

(57) ABSTRACT

Methods, systems, and apparatus for generating and associating meta-data with a final form presentation datastream document where the meta-data is structured in accordance with the datastream component architectures. Meta-data objects ("MDOs") are architected as components of a presentation document and thus are well defined to allow applications to reliably access and process the meta-data contained therein. The MDOs may be associated with other components of the document and are architected to be extensible and flexible while still adhering to an architectural structure. The MDOs may be descriptive (no affect in document presentation) or operational (affects document presentation if processed). Standard types of MDOs may include XML standard information, JDF standard information, PWG standard information, and digital signature information. A variety of standard categories further define typical meta-data forms and applications thereof.

3 Claims, 7 Drawing Sheets

OTHER PUBLICATIONS

Wong, K. et al.; *Improving Document Clustering by Utilizing Meta-Data;* Association for Computing Machinery Digital Library; Publication title unknown; ;2002.

Dogac, A. et al.; *A Workflow-Based Electronic Marketplace on the Web;* Association for Computing Machinery Digital Library; SIGMOD Record, vol. 27, Bo. 4; Dec. 1998.

\* cited by examiner

EXTENDABLE META-DATA SUPPORT IN FINAL FORM PRESENTATION DATASTREAM PRINT ENTERPRISES

BACKGROUND

1. Field of the Invention

The invention relates to the field of printing systems and applications operable in accordance with document presentation architectures and in particular relates to an enhancement to document presentation architectures to provide for extendable meta-data to be formally associated with presentation files.

2. Statement of the Problem

In large enterprise document printing/presentation environments, various final form presentation datastream standards are used to provide for standardized, complete definition of the final form for printing or other presentation of a document file. As used herein, "final form" refers to the complete definition in the presentation document of all information to define the content of the document and the formatting for presentation to a user (e.g., printed, displayed, etc.). Some final form standards are referred to as a "datastream" in that they comprise a continuous stream of data defining a sequence of data representing a sequence of one or more sheet sides in a sequence of one or more documents.

The Advanced Function Presentation ("AFP") architecture, such as that specified by IBM at www.ibm.com and entitled "Mixed Object Document Content Architecture" ("MO:DCA"—IBM document SC31-6802 which is hereby incorporated by reference), is exemplary of a final form presentation datastream and is often applied to high volume transaction processing printing and presentation environments. Although this patent application presents background information and solutions in the context of AFP architecture, similar issues arise in conjunction with other final form presentation datastream standards.

The AFP architecture is a broad specification applicable across an industry of transaction print processing/presentation applications and enterprises. The AFP architecture family of specifications generally specifies the format of files for presentation information including the information to be presented as well as commands and directives (e.g., AFP structured fields) that define intended manner of presentation for the information content within the AFP file. In general, information in an AFP file is referred to as "components" and the file itself may often be referred to as a "document". In AFP terminology a "printfile" may contain one or more documents. For purposes of this presentation, the distinction is not important and thus "printfile" and "document" may be used interchangeably.

The AFP file architecture is designed to allow portability over a wide range of applications and systems. In particular, the AFP formatted files are capable of presentation on a variety of presentation devices having a wide variety of capabilities. In addition to presentation of final form presentation data, it is often useful to process the final form presentation data for other purposes besides presentation. For example, other application systems may process the final form presentation to translate/transform the information into other formats for other processing/presentation purposes. Or for example, other application systems may process the final form presentation data to extract information for other related processing. A system may wish to extract financial information from a final form presentation that represents billing information for customers or payment information for vendors, etc. Or, for example, a print operator may wish to request reprinting of a selected portion of the final form presentation data. Thus, an operator may use an application system to extract a portion of the presentation by reference to certain data—e.g., "reprint all pages that relate to customers in Colorado". In customer support contexts, it is often required to access the actual statements which were sent to a customer, by recalling them from an archive and viewing them on-line in support of a customer phone call.

These and other such non-presentation related applications and systems may benefit from meta-data associated with the presentation file. Meta-data describes information regarding the presentation file other than the data therein to be presented. Attributes and other information regarding the presentation file may be encoded as meta-data and associated with the presentation file. Without meta-data to describe information for such non-presentation applications, the applications may be difficult or impossible, or may result in the exposure of sensitive client information.

However, presently known final form presentation datastreams, such as AFP, do not provide for standardized meta-data formats. Rather, at best, such meta-data may be provided ad-hoc by particular application systems such as by embedding free-form comment fields or objects in the AFP file. Such free-form ad-hoc annotations of a presentation file may provide limited usability for that particular application but cannot readily be utilized by any other non-presentation applications.

For example, the AFP architecture is also intended to permit translation into other formats for presentation and/or editing in a manner that attempts to assure a consistent format for presentation on a wide variety of presentation devices including, for example, displays and hardcopy printing systems. Thus the AFP file includes not only the actual data to be presented (e.g., text and graphical information) but also includes high level descriptions of requirements for formatting the information content to assure a consistent appearance on a wide variety of presentation devices. However, transforming this final form information into another format such as Adobe PDF format may benefit from meta-data that helps assure fidelity of the translation. This and other exemplary transformations require significant intelligence to avoid introducing errors in the various transformations and reverse transformations.

It is generally known in the industry to utilize meta-data to annotate a file with additional information beyond merely that which is required to render the information content of the file. For example, Hewlett Packard printing systems generally process a language referred to as PJL (print job language) useful for annotating the information content of a printable file to provide other information relevant to printing that job other than the mere information content to be rendered. Or, for example, Adobe PDF and Postscript languages specify a comment field that may be used for specifying free format information that may be useful to a particular application programmed to process such comments fields. Other than such specific applications, these comments fields and PJL may be ignored as irrelevant information—only the specific applications designed to process that information will perform any processing when such meta-data is encountered. All other applications not designed to process such information will typically skip the information when attempting to render or otherwise process the data in the print job file (i.e., the presentation file or document).

However, these exemplary known meta-data structures are insufficient to provide the richness of the meta-data required for the wide variety of non-presentation applications exemplified as above. For example, in the current AFP architecture, only ad-hoc un-architected methods or structures permit the addition of such meta-data to an AFP file. More importantly, there is no standard for structuring or organizing any such meta-data in AFP files to permit standardized processing of any included meta-data by any or all application programs compliant with the AFP architecture. Still further, there is no architected mechanism to associate the meta-data with objects of the presentation file. Rather, meta-data information, to the extent it is even utilized with AFP documents, tends to be created ad-hoc by a particular user and/or a particular application system and may therefore be useful only to that user or application. For example, the meta-data may be embedded as free-form commentary in an AFP "NOP" structured field or a "TLE" structured field. The information contained in a NOP structured field is not architected to any standards and the information content allowed in a TLE structured field is very limited.

It is evident from the above discussion that a need exists for an enhancement to the AFP architecture to permit standardized, architected utilization of meta-data for annotation of an AFP file.

SUMMARY

The invention solves the above and other related problems with methods and associated systems and apparatus for standardizing architecture for providing meta-data associated with an AFP document. Features and aspects hereof define a standardized definition for various common types of meta-data and for associating the meta-data objects so defined with presentation objects of an AFP document.

The invention may include other exemplary embodiments described below.

DESCRIPTION OF THE DRAWINGS

The same reference number represents the same element on all drawings.

DETAILED DESCRIPTION OF THE DRAWINGS

FIGS. 1 through 9 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Although this patent application presents features and aspects of the invention described in the context of the AFP architecture, other final form presentation datastream standards may similarly benefit from the standardized inclusion of meta-data and use of such meta-data in both presentation and non-presentation related applications and systems. Certain terminology used hereinafter is represented by initials or acronyms defined in the AFP specifications and well known to those of ordinary skill in the art. To any extent that such terminology is unclear from the context, greater understanding can be obtained by reference to a standard dictionary of terminology used in the printing industry, such as the dictionary provided by IBM and identified as Publication G544-3973-00 and the aforementioned MO:DCA reference—both freely available at www.ibm.com. Further, such acronyms as defined in the AFP specifications will be similarly applicable to equivalent structures in other final form presentation datastreams. Those of ordinary skill in the art will readily recognize the mapping of features and aspects hereof to such other datastreams.

Figure 1:
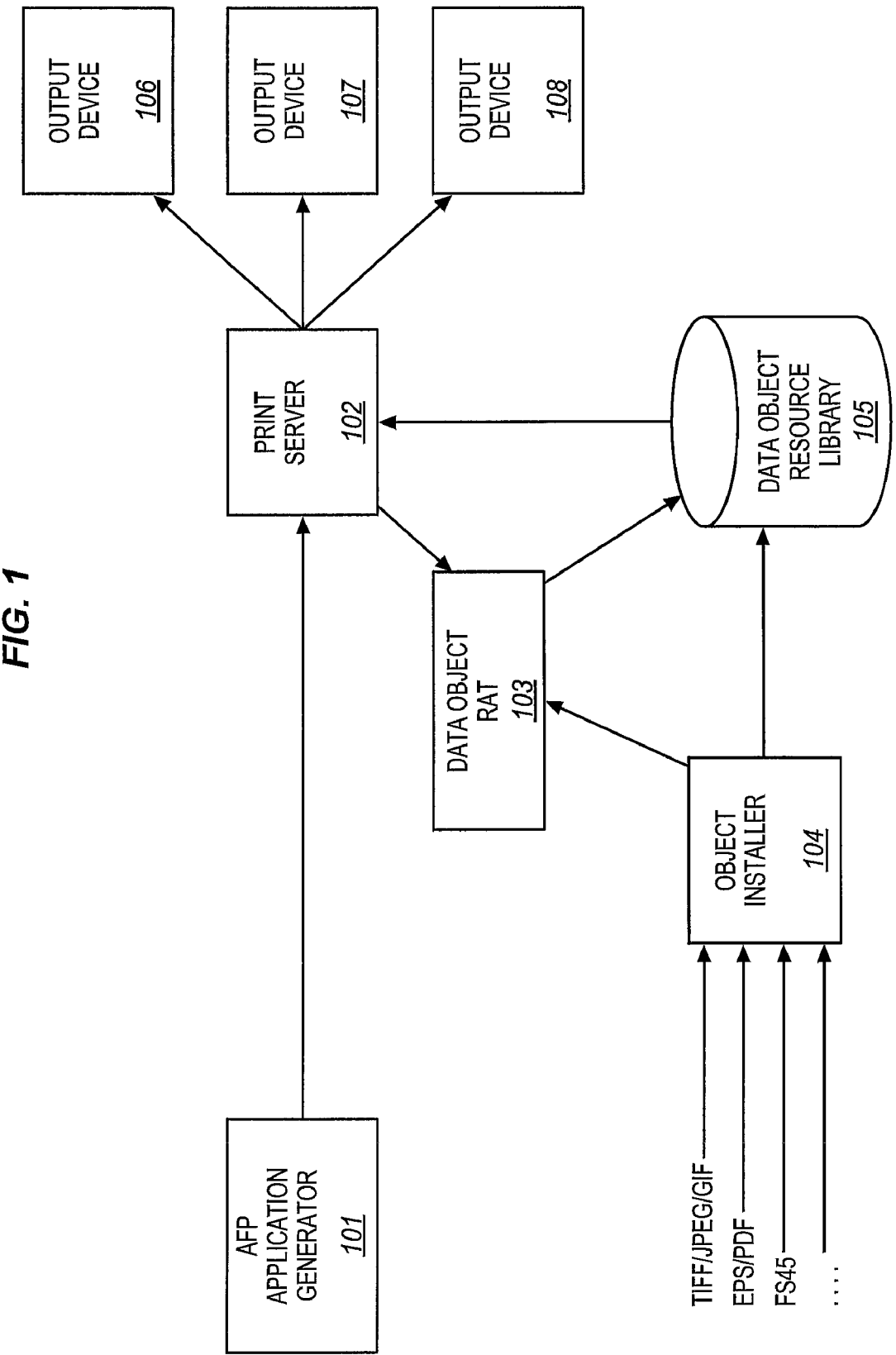
FIG. 1 is a schematic diagram of an exemplary AFP environment in which features and aspects hereof may be advantageously applied.

FIG. 1 is a block diagram of an exemplary AFP print environment in which features and aspects hereof may be advantageously applied. The environment of FIG. 1 involves use of a processor such as a print server, for example, which receives a document, processes it, and forwards it as a datastream to an end point presentation device such as a printer, print engine, display, or the like. Typically, such a processor has associated storage capability, such as disk files, in which program modules such as instructions and profiles can be accessibly stored for execution on the processor as desired.

In the AFP architecture a Mixed Object Document Content Architecture (MO:DCA) document, which may contain multiple documents, is provided to a print server. The print server then generates an Intelligent Printer Data Stream ("IPDS") command stream for sending to a printer or other output device for the purpose of outputting (e.g., presenting) the document. In its most complex form, an MO:DCA document contains data objects along with data structures which define the document's layout and composition features. This form is called an MO:DCA presentation document. Features and aspects hereof which provide for meta-data in such an environment are described herein below with reference to MO:DCA documents.

More specifically, FIG. 1 is a schematic diagram of an exemplary AFP environment in which features and aspects hereof may be advantageously applied. In the FIG. an AFP application generator 101 sends a MO:DCA document to print server 102 for outputting. Note that for the purposes of this description it is assumed that the MO:DCA document may include a reference to an object external to the document which is accessible to print server 102 to effectuate presentation or other processing of the document. The object could, for example, be a TIFF/JPEG/GIF object, an EPS/PDF object, an FS45 object, objects related to meta-data (including, for example, MDOs, XML information (including XML Document Type Definitions—"DTDs", JDF information, digital signature information, etc.), or other objects of a defined format in accordance with AFP standards. Such objects are installed via Object Installer 104 which stores objects in an object resource library 105 and further stores details of an object, and where it is installed, in an entry of a Resource Access Table (RAT) 103. The RAT 103 is effectively an index which the print server 102 may use to locate the object in storage.

When the print server 102 receives the MO:DCA document from AFP application generator 101 it processes the document by converting it to an IPDS command stream for forwarding to an output device. As part of this process the print server 102 may obtain the name from the object reference included in the document and may use the name to locate the entry in the RAT 103 which relates to the object. From this the Print Server obtains the object from the Resource Library 105 and imbeds it into the IPDS command stream. The completed IPDS command stream is then forwarded by the printer server 102 to an appropriate output device (e.g., 106, 107, and 108). The output device could be, for example, a printer, and further could be a device which processes an IPDS command stream for subsequent output by a different device, or adds the finished production print file to an archival system.

The components of an MO:DCA document are defined by the AFP standards with a syntax which consists of self-describing structures. Structured fields are the main MO:DCA structures and these are used to encode MO:DCA commands. A structured field starts with an introducer which uniquely identifies the command, provides a total length for the command, and specifies additional control information such as whether padding bytes are present. The introducer is followed by up to 32,759 data bytes. Data may be encoded using fixed parameters, repeating groups, keywords, and triplets. Fixed parameters have a meaning only in the context of the structure that includes them. Repeating groups are used to specify a grouping of parameters which can appear multiple times. Keywords are self-identifying parameters which consist of a one-byte unique keyword identifier followed by a one-byte keyword value. Triplets are self-identifying parameters which contain a one-byte length, a one-byte unique triplet identifier, and up to 252 data bytes. Keywords and triplets have the same semantics wherever they are used. Together, these structures define a syntax for MO:DCA documents which provides for orderly parsing and flexible extensibility.

An MO:DCA printfile is defined in a hierarchy of components and the printfile component is the highest level of the hierarchy. Documents are at the next level and can be made up of pages, and page components are at the intermediate level of the hierarchy. Further, pages can be made up of objects and objects components are at the lowest level of the hierarchy. Further, groups of pages may exist within a print-file, and define individual mail pieces, customer statements, or other indivisible groups of pages subject to presentation or regulatory requirements. Object components can, for example, be bar codes, graphics, images, and presentation text. Multiple documents can be grouped together into a print-file.

At each level of the hierarchy certain sets of MO:DCA structured fields are permissible. The document, pages and objects are bounded by a pair of structured fields, known as begin-end pairs, which define a presentation wrapper for the data-stream components.

Figure 2:
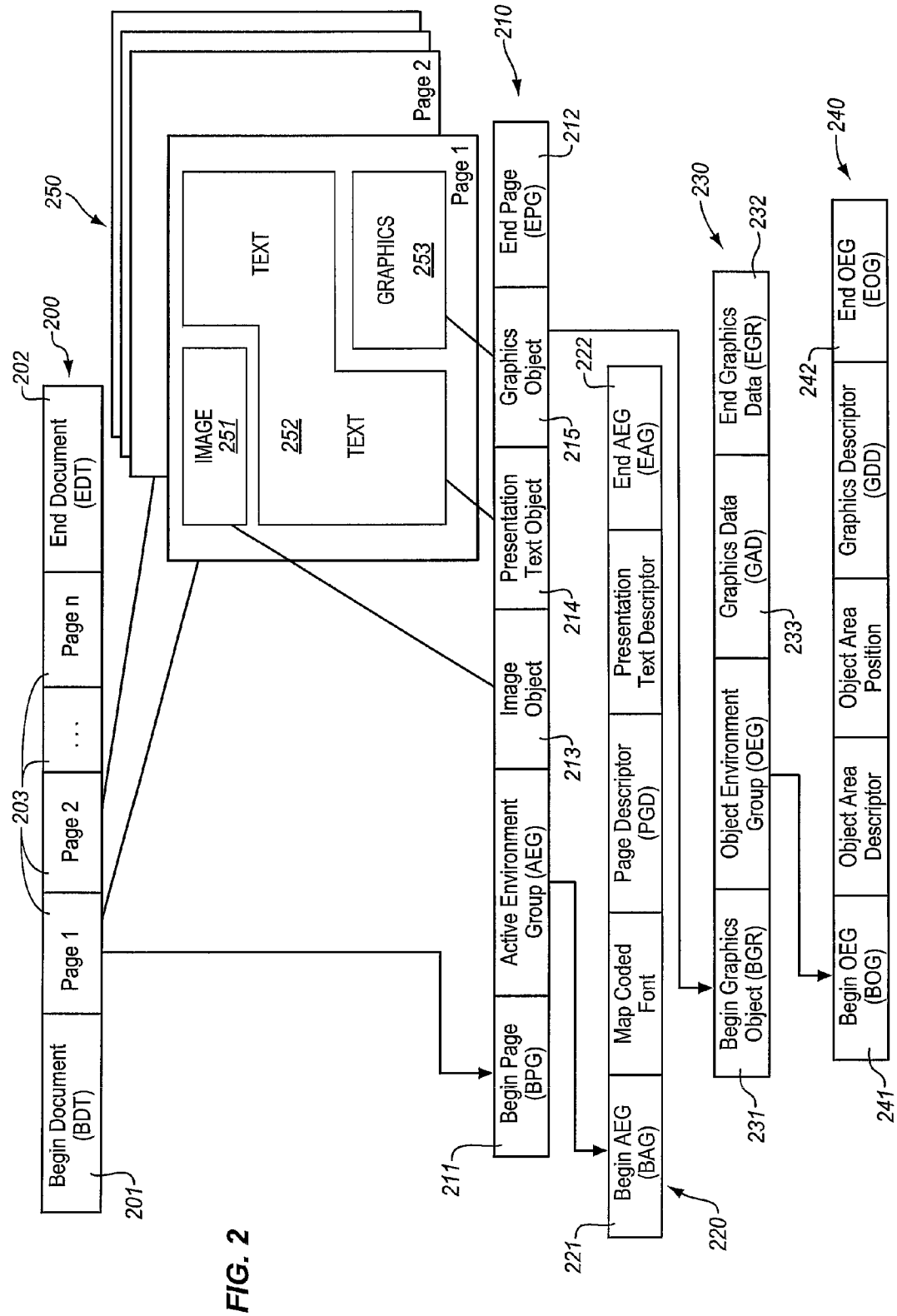
FIG. 2 is a diagram which illustrates the hierarchy of the main components which comprise an exemplary Mixed Object Document Content Architecture—Presentation ("MO:DCA") AFP document.

FIG. 2 is a diagram which illustrates exemplary main components of this hierarchy for an exemplary MO:DCA document which defines a document 250 for printing. The document 250 comprises several pages and the content of page 1 is illustrated. This page contains an image object 251, a section of text 252, and a graphics object 253 such as a bar chart.

The highest level component of the MO:DCA document of FIG. 2 is the document component which is defined by a begin-end pair comprising a "Begin Document" (BDT) structured field 201 and ends with an "End Document" (EDT) structured field 202. Each page within the document is independent from any other page and the BDT structured field is followed by separate details 203 of each page to be printed. Each of these separate details 203 comprise a page component 210 which is defined by a begin-end pair comprising a "Begin Page" (BPG) structured field 211 and an "End Page" (EPG) structured field 212. The BPG structured field is followed by an Active Environment Group (AEG) 220 which defines resource and layout information for the page such as measurement units, page width, and page depth. The page component 210 also includes details of each of the objects which make up the page. These details comprise image object details 213, presentation text object details 214 and graphics object details 215. For example the Graphics objects details are contained in a graphic object component 230 which is defined by a begin-end pair comprising a "Begin Graphics Object" (BGR) structured field 231 and an "End Graphics Object" (EGR) structured field 232. The BGR structured field is followed by an Object Environment Group (OEG) 240 and the graphics object data 233. The OEG 240 defines resource and layout information for the graphics object such as placement and orientation of the graphics object on the page. Note that, although not shown in the FIG., the image object details 213 and presentation text details 214 will comprise an image object component and a presentation text component, respectively, which are similar to the graphics object component 230, but with appropriate begin-end pairs. Similarly, although not shown in FIG. 2, the "Begin Named Group" (BNG) and "End Named Group" (ENG) structures can create groups of pages, and as should be recognized by one skilled in the art, the field of the invention can apply to any such hierarchical begin-end pairs of grouped pages as well.

Note that alternatively to including the actual data object in the MO:DCA document, for example, as shown in FIG. 2 for graphics object 233, a reference to the data object can be included. For example, the reference to the data object can be contained in a resource object component instead of a data object component, such a resource object component being defined by a begin-end pair comprising a Begin Resource (BRS) structured field and an End Resource (ERS) structured field. Further such a resource object can include reference to a secondary resource object.

Further note that not all possible components of an MO:DCA document have been described with reference to FIG. 2. For example the document can include overlay components which are page-like components which define their own environment parameters.

Figure 3:
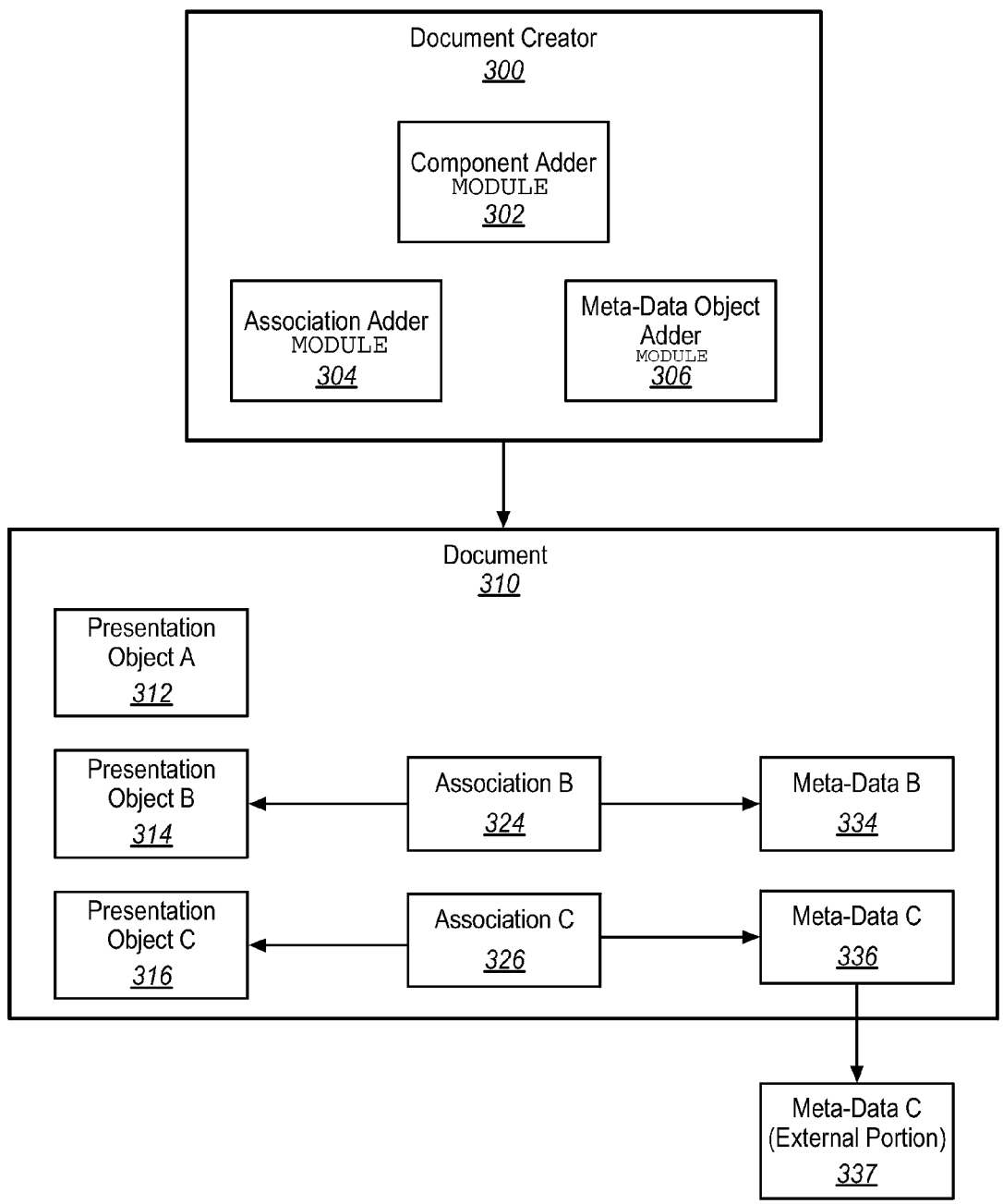
FIG. 3 is a block diagram showing exemplary functional elements operable in an AFP document creator in accordance with features and aspects hereof.

FIG. 3 is a block diagram describing exemplary functional elements operable within a system such as FIG. 1 operable in accordance with features and aspects hereof. Document creator module 300 is operable to generate an AFP document and associated meta-data objects. Component adder module 302 is generally operable to create new AFP presentation components in document 310. As shown in FIG. 3, document 310 has three exemplary presentation objects/components created therein. Presentation object A 312, B 314, and C 316 represent three exemplary AFP components created by component adder module 302 of document creator module 300. As will be readily apparent to those of ordinary skill in the art, exemplary presentation objects A, B, and C are intended merely as representative of any of the wide variety of AFP objects/components, commands, and structured fields.

Document creator module 300 may also include meta-data object adder module 306 operable to create new meta-data objects. As discussed further herein below, the meta-data information may be co-resident with other AFP objects within the document 310 as shown by meta-data object B 334 and meta-data object C 336. Meta-data objects can include reference to additional information stored external to the document 310. For example, as discussed further herein below, a meta-data object 336 may reference external additional data such as XML information or other non-presentation related information.

In addition, document creator module 300 may include association adder module 304 for generating an association between an identified AFP presentation object (312 through 316) and a meta-data object (334 through 336.). As shown in FIG. 3, two associations are generated within AFP document 310 by association adder module 304. In particular, presentation object B 314 and meta-data object B 334 are shown to be associated with one another by association element B 324. In like manner, AFP presentation object C 316 and meta-data object C 336 are shown to be associated with one another by association element C 326. As discussed further herein below, the association between a presentation object and a meta-data object may be defined by assigning a scope attribute to a meta-data object when it is generated by meta-data object adder module 306. Thus a meta-data object may be associated with any or all AFP presentation objects.

In the context of AFP architecture, a presentation object may reference or associate with an MDO by use of a Map Data Resource ("MDR") structured field, The MDR specifies the name of the MDO to associate the MDO with a specified scope of objects in the AFP document. The scope attribute of the MDR indicates the scope of AFP presentation objects that are associated with the named MDO. The scope attribute may indicate, for example, that a meta-data object is associated with the particular AFP object within which the MDR is defined, with all objects for a particular page or group of pages, with all objects of the entire document, etc. The scope attribute and the context in which the MDR is defined determine which objects are associated with a named MDO. Use of such named resources within the AFP architecture using an MDR structured field or other techniques and structures is well known to those of ordinary skill in the art and is well documented in the above identified programming guide document.

For example, a reference from a document component to a meta-data object may be encoded in the AFP components by any of the following exemplary structures:

Meta-data can be referenced in MO:DCA datastreams as a secondary resource using the Fully Qualified Name ("FQN") type X'DE'—secondary resource reference—triplet;

The FQN type X'DE' triplet can be specified:

On an MDR in a DEG to associate a meta-data object with a printfile or a document in the printfile, On an MDR in an AEG to associate a meta-data object with a page or overlay, On a BNG to associate a meta-data object with a particular grouping of pages, such as an individual customer statement or any other hierarchical collection of pages, On an MDR in an OEG to associate a meta-data object with a data object, On an IOB to associate a meta-data object with a presentation object to be included on a page/overlay, On a PPO to associate a meta-data object with a presentation object to be pre-RIP'd, and On an MDR in a Medium Map to associate a meta-data object with the group of pages/sheets that are processed by that Medium Map;

The FQN type X'DE' triplet may be allowed on a BDT and BNG to associate a meta-data object with a document or page group without going through a FormDef or Medium Map;

A meta-data object reference may also be allowed in a PTOCA object to associate a meta-data object with a specific text string. This may be most easily accomplished using a mechanism similar to text suppression. In other words, in accordance with features and aspects hereof, there are new Begin/End Meta-data Association text controls to bracket the data to be associated with a meta-data object, and there is an LID on the Begin so that a meta-data object, mapped in the AEG of the page, can be associated with that text string.

Each meta-data object may be specified as a component in the AFP document analogous to the structure of other components in accordance with the AFP specifications. In particular a header portion of an MDO may include information useful for processing of the meta-data as well as for establishing the associations discussed above.

The MDR may also include a processing mode field as is known in the AFP architecture indicating whether processing of the identified MDO does or does not affect generated output of the document. An MDO that is merely "descriptive" has no affect on presentation of the document. An MDO that has a processing mode of "operational" may affect processing for the document—optionally affecting the presentation format or other aspects of presentation of the document. Thus, a descriptive mode MDO may be processed or may be ignored and will have no affect on the generated output of processing the AFP document. By contrast, an operational mode MDO may be ignored while generating output corresponding to the AFP document (thus having no affect on the generated output from the document) or may be processed in a manner that may affect the generated output from the AFP document. A specific embodiment of this relates to multiple-presentations of the same document. A document may be presented once, and then optionally presented (n) additional times during follow-up operations. One of ordinary skill in the art will recognize that this often occurs for sensitive customer statements, which may be printed and mailed as a secure initial customer communication, and then accessed subsequently via archive retrieval for customer support operations. In this context, and any other multiple-presentation scenario, the operational mode MDO may also specify controls that conditionally affect generated output of a document. For example, presenting the entire account number, social security number, or other sensitive information may be required during secure printing operations, but may be inappropriate when presenting a transaction on-line for overseas telephone support personnel. Thus, the MDR and operational mode MDO may be used to mask, eliminate, or only partially present sensitive customer data during some presentations, while enabling it for primary presentations such as first-run printing operations or secure reprints. This enables compliance with mandates to protect sensitive customer data from disclosure, and enhances control over out-sourced operations which may include phone support for customer transactions. One of ordinary skill in the art will recognize that this aspect relates to a wide variety of implementations, including presentation of only the last few digits of a sensitive field, masking off the sensitive data entirely, taking conditional actions based on the authority level or clearance of the person viewing the transactional records, and controlling what portion if any of sensitive data is suitable to export via conversion to another datastream.

Examples of descriptive mode meta-data objects may include:
  accounting information,
  content description,
  configuration information,
  source data information,
  reconciliation information,
  security information,
  digital signature information, and
  processing cost information.

Examples of operational mode meta-data objects may include:
  document finishing information,
  resource locator information (indicating a preferred location for resources external to the AFP document),
  presentation information (presentation hints for preferred format and style of presentation),
  identifiers and masks for sensitive data within any text, image, resource, or other context,
  JDF job ticket information, error processing information,
  autonomic information (information to support optimized rendering of the document content), and
  routing information.

Those of ordinary skill in the art will also recognize that an MDR may reference an MDO that is not stored physically within the document. Rather, the MDO could be stored in an external library associated with the printing systems and may be dynamically loaded to permit processing of the document. Such design choices in AFP and other final form presentation datastreams will be readily apparent to those of ordinary skill in the art.

Figure 4:
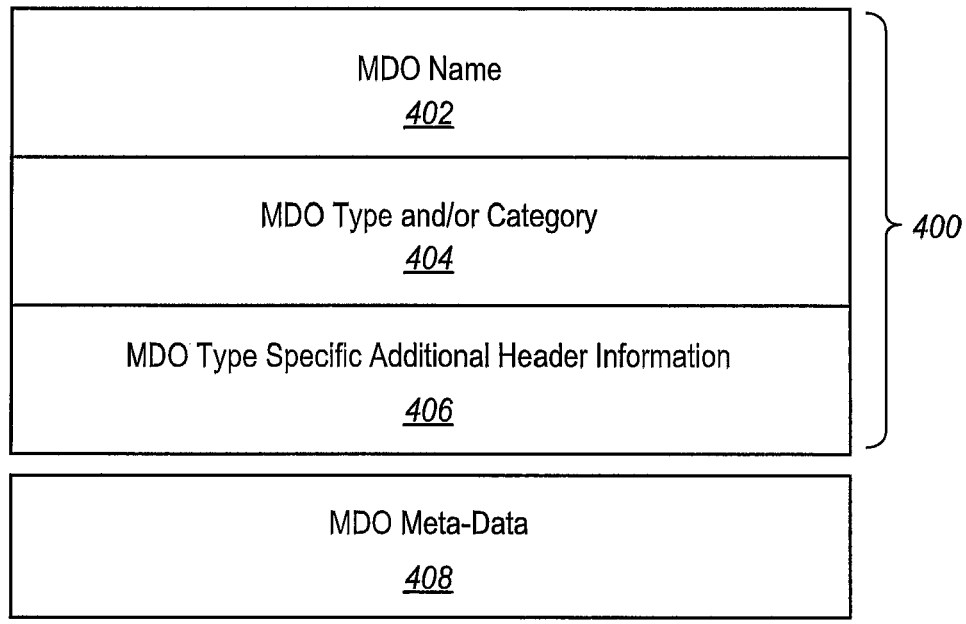
FIG. 4 is a block diagram of an exemplary header block for a meta-data object in accordance with features and aspects hereof.

FIG. 4 shows an exemplary header of an MDO structure as a component in an AFP document. MDO header 400 may include an MDO name field 402 providing a user specified name uniquely identifying the corresponding meta-data object. The MDO header 400 may also include an MDO type and/or category field 404 identifying specified types/categories of standard meta-data structures. Various standardized types and categories may be specified in accordance with features and aspects hereof as standard within an AFP document supporting meta-data objects while still allowing for extendible user-defined types and categories to be specified for particular applications. Standardized types may include: standardized imaging system counter information such as specified by the Printer Working Group in public documents readily available at www.pwg.org. Another standardized type may provide for digital signature information useful as meta-data for securing and certifying contents of a corresponding AFP document. Yet another standardized MDO type may provide for job ticketing information such as defined by an industry trade organization with documents published at www.cip4.com. Still further, another standardized MDO type may provide for embedding XML data information in the meta-data object. These and other standardized types of MDO information permit users to utilize well known standards for specifying meta-data information relating to components of an AFP document or relating to the entire document.

Still further, subcategories of the various types may be provided to indicate the broad category of information in addition to the format indication of the MDO type field. A variety of standardized categories may be provided in accordance with features and aspects hereof including, for example:
  Accounting information
  Alternative object definition
  Annotation information
  Autonomic information
  Configuration information
  Content description
  Document finishing information
  Error processing information
  Presentation information
  Reconciliation data
  Resource locator
  Routing information
  Security information
  Source information These and other exemplary categories are useful when defining MDO information to permit standard categorization of the MDO information for use by a wide variety of standardized applications adhering to the AFP architecture standards (enhanced in accordance with features and aspects hereof to support a meta-data architecture). As above with the MDO type information, other categories may be defined by users to provide for specialized categories in particular applications. The MDO header 400 may also include other header information specific to the particular type of MDO. MDO type specific additional header information element 406 provides such additional header information as may be required for a particular type (and/or category) of MDO header 400. Following the MDO header 400 is the MDO meta-data 408— the actual meta-data information of the identified type and category.

Figure 5:
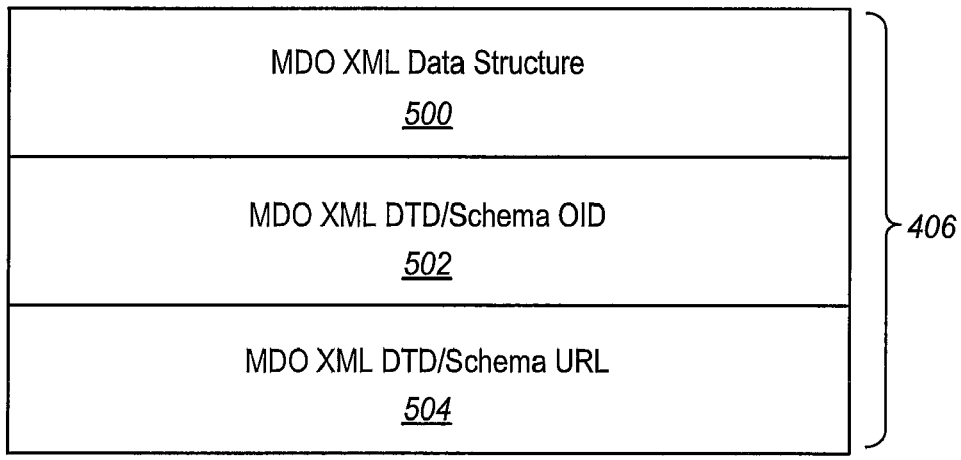
FIG. 5 is a block diagram of an exemplary XML structure block for an XML type meta-data object in accordance with features and aspects hereof.

One particularly useful MDO type allows for specification of XML data as meta-data within the AFP document. As noted above, one standard type of meta-data object provides for the inclusion of XML information in the MDO. Thus the MDO meta-data 408 described above may include XML information. For an XML type MDO, the type specific additional header field 406 may therefore provide yet further structure for utilizing the XML information provided by the meta-data object. FIG. 5 provides exemplary details of additional header field 406 of FIG. 4 as may be useful in providing XML meta-data in the MDO. The XML data structure field 500 (of the additional header information field 406) indicates whether a DTD and/or schema is provided for use of the XML data in meta-data field 408 and, if present, where the DTD and/or schema is stored. For example, the XML information in the meta-data field 408 may be provided devoid of any DTD and/or schema normally associated with the XML information. Alternatively, the DTD and/or schema for the XML information may be embedded preceding or following the XML meta-data information in 408. Still further, the DTD and/or schema information may be stored external to the MDO and identified by an object ID ("OID") indicator or identified by a URL. The OID or URL identifies an externally stored and accessible source for obtaining the XML DTD and/or schema. Where the data structure field of 500 indicates that a global object ID is used to identify the DTD and/or schema, the OID field 502 provides the object ID for such information. Similarly, where the data structure field 500 indicates that the DTD and/or schema for the XML information is provided as a URL, URL field 504 provides the URL string for locating the desired DTD and/or schema information for the XML information.

Those of ordinary skill in the art will readily recognize a variety of data structures and field definitions that may be employed for the meta-data objects. The discussion above with respect to FIGS. 3, 4, and 5 are therefore intended merely as suggestive of all such possible structures and field definitions useful for creating and manipulating meta-data objects and for associating such objects with other components of an AFP document. For example, as is well known in the art, the data structures suggested above may be fixed length structures with predetermined fixed size fields or may be a variable length structures with variable field sizes and appropriate length values encoded within. Such design choices are well known to those of ordinary skill in the art.

Figure 6:
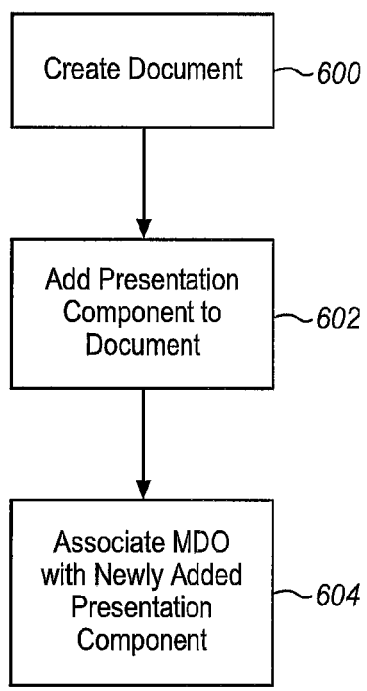
FIG. 6 is a flowchart describing an exemplary method for adding meta-data objects in association with a newly created AFP document in accordance with features and aspects hereof.
Figure 7:
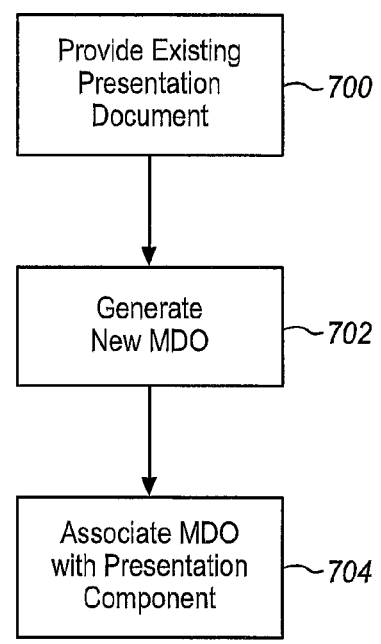
FIG. 7 is a flowchart describing an exemplary method for associating meta-data objects with a pre-existing AFP document in accordance with features and aspects hereof.

FIGS. 6 and 7 are flowcharts broadly describing the operations of a data processing system in accordance with features and aspects hereof for adding and/or generating meta-data objects and associating such objects with components of a presentation document. In general, generation of meta-data objects and association of such objects with components of a presentation document may be performed as the document is initially created or may be performed by adding or appending meta-data information to a previously generated document. FIG. 6 is generally suggestive of a method in accordance with features and aspects hereof to create a document and associate meta-data objects with other presentation objects as the document is initially created. Element 600 represents processing for the initial creation of a document. Element 602 then represents processing to add a component to the newly created document while element 604 represents processing to associate a meta-data object with the newly added component. Both the meta-data object and presentation object may be added to the newly created document and appropriately associated with one another as desired. Those of ordinary skill in the art will readily recognize that elements 602 and 604 may be performed repetitively to add additional components to the newly created document and to appropriately associate meta-data objects with each newly added component as desired.

FIG. 7 broadly represents processing in accordance with features and aspects hereof to annotate an existing document to generate new meta-data objects by generating new meta-data objects and associating the meta-data objects with existing components within the existing document. Element 700 represents processing to provide an existing document. An identified document is located and opened for processing that appends/inserts meta-data objects in the document and generates appropriate associations between the added meta-data objects and the preexisting presentation objects within the located document. Element 702 represents processing to generate new meta-data objects in accordance with particular user or application requirements. Element 704 is operable to generate required associations between the newly generated meta-data objects and pre-existing components within the opened document. Those of ordinary skill in the art will readily recognize that elements 702 and 704 may be performed repetitively to add additional meta-data objects and associate them with preexisting components within the preexisting document.

Figure 8:
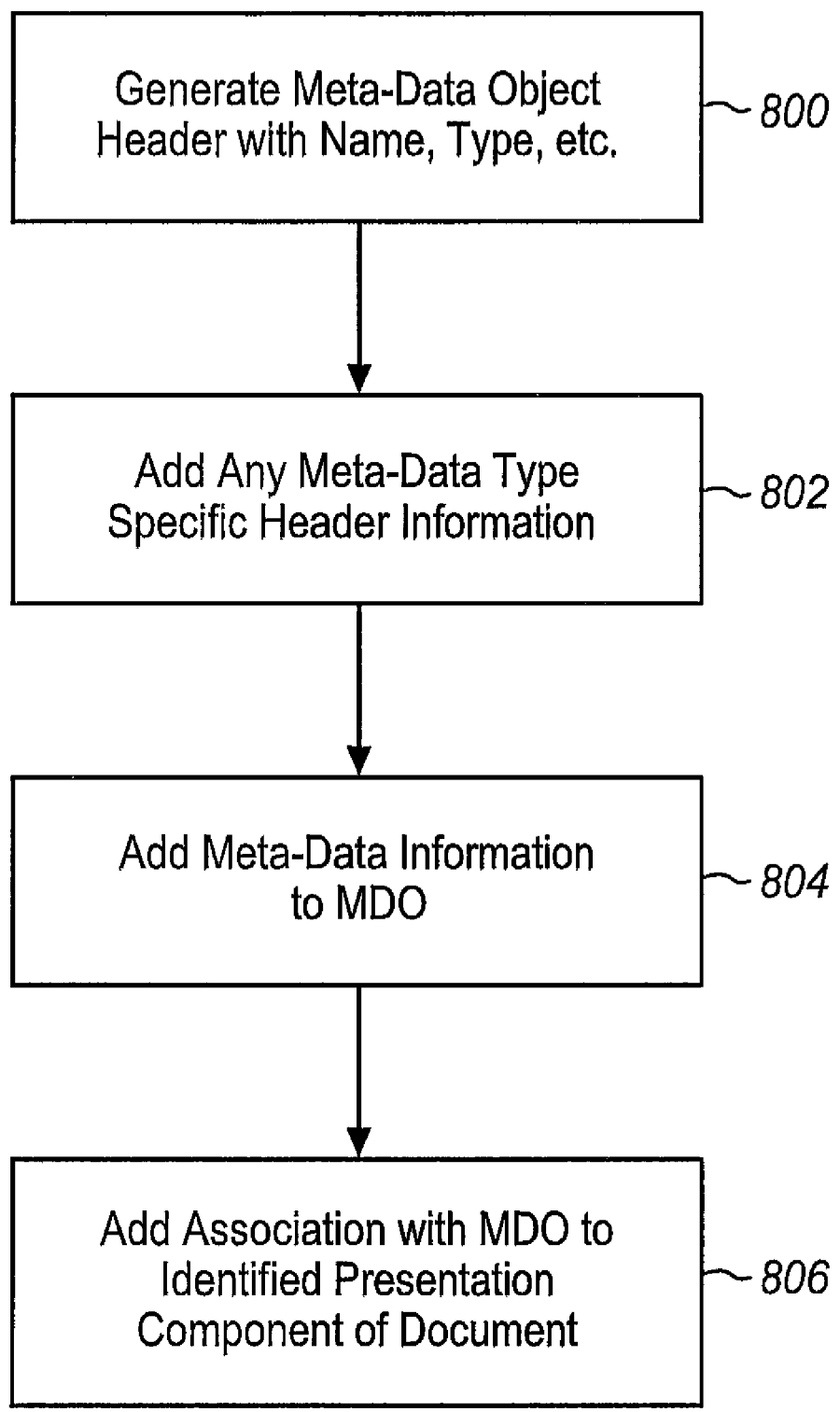
FIG. 8 is a flowchart providing exemplary additional details of processing to generate a meta-data object and to associate it with presentation objects of an AFP document in accordance with features and aspects hereof.

FIG. 8 is a flowchart providing exemplary details of processing to generate a new meta-data object and to associate the meta-data object with presentation components within a presentation document. Regardless of whether a meta-data object is being added along with newly created presentation objects in a newly created document or whether the meta-data object is being added to a preexisting document, the processing of FIG. 8 represents the steps for generation of a new MDO and associating it as required with components of the document. Element 800 is first operable to generate a meta-data object header as described above with regard to FIG. 4. The header includes, for example, a meta-data object name and an MDO type and/or category. Element 802 may then add other header information fields specific to the particular type of the MDO header. Element 804 is then operable to add the actual meta-data information following the completed MDO header to form the completed MDO structure. Element 806 is operable to generate appropriate association information between the newly generated MDO and one or more identified presentation components of the document. As indicated above, an MDR object may be used to create such an association. A scope attribute field of the MDR serves to indicate a scope of the components within the document with which the newly the generated MDO is associated.

Figure 9:
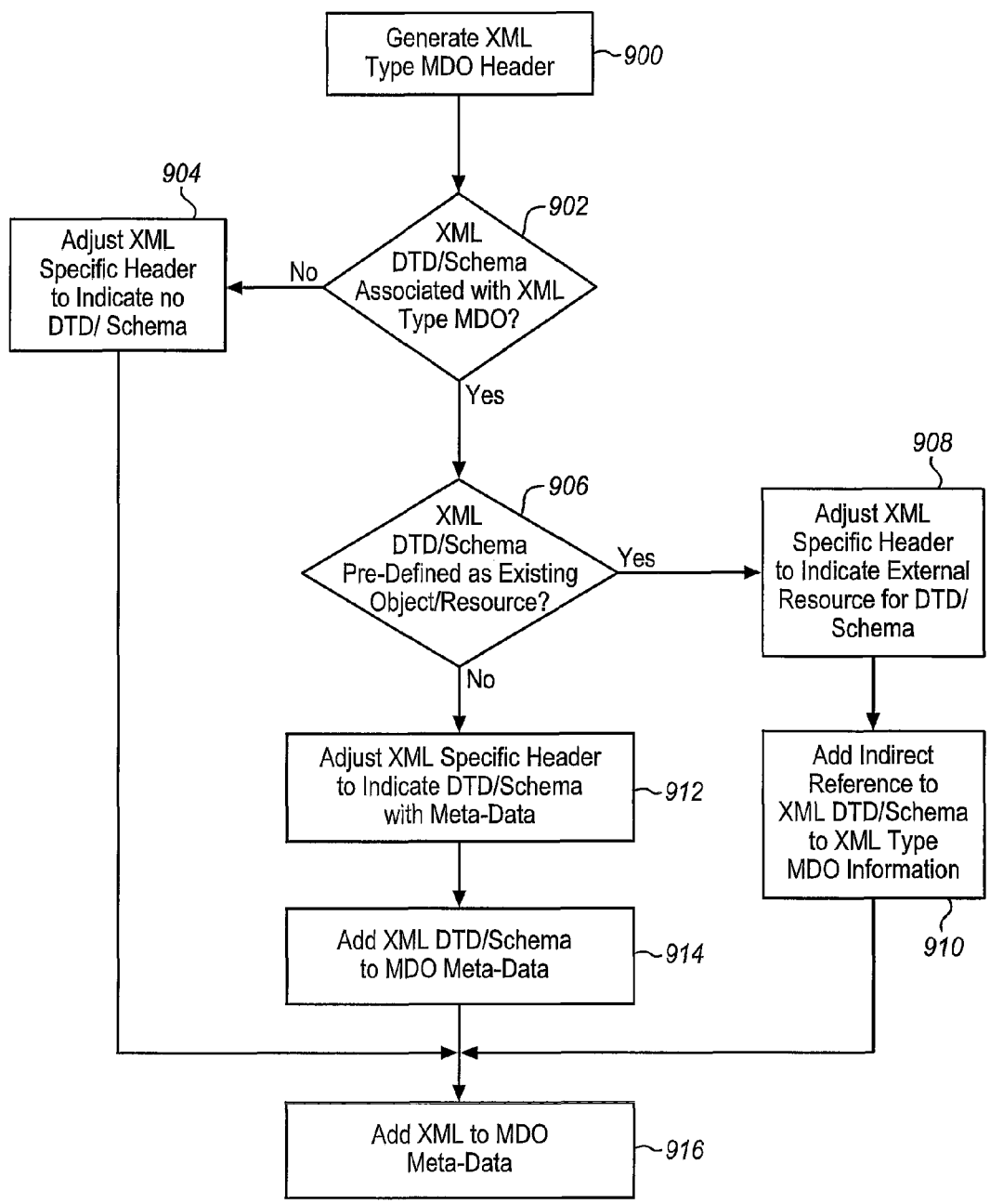
FIG. 9 is a flowchart providing exemplary additional details of processing to generate XML information as meta-data in a meta-data object associated with an AFP document.

As noted above, a particularly useful meta-data object embeds XML information within the document. FIG. 9 is a flowchart providing exemplary details for generating XML information in a meta-data object structure in accordance with features and aspects hereof. The meta-data XML information elements of FIG. 4 above and as detailed by way of example in element in FIG. 5 above, contains the XML information when the meta-data object header indicates that the MDO type attribute is XML information. The actual XML information is stored as the meta-data information portion of the meta-data object. In the case of an XML type meta-data object, the meta-data header contains additional header structure providing additional structural information regarding the XML information embedded in the MDO meta-data information that follows the header. In particular, the XML DTD and/or schema information may be embedded directly within the meta-data information field of the meta-data object (along with the XML information itself) or the DTD and/or schema may be provided external from the meta-data object and indirectly referenced. Such indirect reference may take the form of an object identifier (OID) or a universal resource locator (URL) uniquely identifying the external resource that contains the desired DTD and/or schema information.

Element 900 is therefore operable to generate a meta-data object header indicating an XML type attribute for the MDO. Element 902 is then operable to determine whether any XML DTD and/or schema information is associated with this XML meta-data object. If not, element 904 so indicates in the XML specific portion of the MDO header and continues at element 916 to move the XML information into the meta-data portion of the MDO. If element 902 determines that some DTD and/or schema is associated with this XML type MDO, element 906 is then operable to determine whether any XML DTD and/or schema information is to be embedded in the meta-data information of the MDO or is pre-existing as an external resource (external from the presentation document). If element 906 determines that XML DTD and/or schema information is to be embedded as meta-data, element 912 is operable to so indicate the embedding of the DTD and/or schema in the meta-data portion of the MDO. Element 914 then adds the XML DTD and/or schema to the meta-data information of the MDO and element 916 moves the actual XML information into the meta-data portion of the MDO. Typically the DTD and/or schema will precede the XML information in the meta-data field of the MDO.

If element 906 determines that a pre-existing DTD and/or schema is to be referenced, element 908 adjusts the MDO to so reflect that an external resource provides the DTD and/or schema. Element 910 then adds the particular resource identity to the XML specific portion of the MDO header. As noted above, the resource may be identified by an OID, a URL, or any other suitable identifier. Element 916, as above, then completes the MDO by adding the XML information to the meta-data portion of the MDO.

As noted above, AFP and other final form presentation datastream standards are typically transformed into another device specific format for processing within a particular printer or display device. For example, the AFP document could be transformed into IBM Intelligent Printer Data Stream ("IPDS") for transmission to a compatible printer. Or, for example, a final form presentation datastream file could be transformed into Adobe Postscript or PDF for transmission to a compatible printer or display device. In such transformations, the meta-data information associated with the presentation file may be transformed into corresponding commands or directives in the device specific datastream. In particular operational processing mode meta-data objects may translate very directly into device specific commands. Still more specifically, AFP structured fields may translate very directly into IPDS commands.

Further as noted above, a document with embedded meta-data may be used for a variety of non-presentation applications. The architected meta-data information in the presentation document may be accessed and used to perform these various non-presentation functions. For example, non-presentation applications may include:

using descriptive meta-data to data-mine the document;
performing address verification/cleansing of information in the document;
performing address sorting in the document to optimize print order for postage costs;
generating subset documents to be presented for targeted mailings;
generating document statistics for accounting applications; e.g., number of customers older than 50 yrs, number of customers in California, etc.;
generating document statistics to determine processing cost, e.g., number of pages printed, average number of pages/customer, etc.;
supporting secure printing;
adding a digital signature to the printfile;
identifying critical data in the printfile that is to be verified by a post-processing operation;
creating an associated file, such as an inserter control file, which synchronizes and controls post-processing equipment;
using operational metadata to optimize presentation;
determining hints to improve transforms to other formats, e.g., identifying alternate fonts, critical text strings that need to remain coded information, etc.;
associating job ticket (e.g., JDF) information to be used for processing specific document components;
determining document routing information;
determining autonomic information to aid in processing the document;
determining error processing information for document components, e.g., a URL to locate resources on the web if the resources are not found in the normal search paths;
determining presentation hints for objects in the document; and
determining alternate processing information, e.g., if you can't find resource "A", use resource "B".

Although specific embodiments were described herein, the scope of the invention is not limited to those specific embodiments. The scope of the invention is defined by the following claims and any equivalents thereof.

We claim:

1. A method comprising:
providing a final form presentation datastream document wherein the document includes:
a plurality of final form presentation datastream compliant presentation components within the document; and
associating a unique meta-data object (MDO) with at least two components, wherein the MDO is identifiable by a non-presentation application for processing the plurality of components based on its associated MDO, and wherein the MDO does not affect a presentation of the document;
identifying the plurality of MDO's by processing the document with a non-presentation application; and
processing the plurality of components associated with its identified MDO by the non-presentation application by:
processing meta-data to data-mine the document;
performing address verification of information in the document;
performing address cleansing of information in the document;
performing address sorting in the document to optimize print order for postage costs;
generating one or more subset presentation documents to be presented for targeted mailings;
generating document statistics for accounting applications
generating document statistics to determine processing cost;
providing support for secure presentation of the document;
adding a digital signature to the document;
identifying critical data in the document that is to be verified by a post-processing operation;
processing operational metadata to optimize presentation;
determining hints to improve transforms to other formats;
associating job ticket information to be used for processing specific document components;
determining document routing information;
determining autonomic information to aid in processing the document;
determining error processing information for document components,
determining alternate locations for external resources; and
determining alternate resources for an identified resource determined to be unavailable, wherein the MDO does not affect presentation of the document.

2. The method of claim 1 wherein the meta-data includes descriptive mode meta-data that does not affect presentation of the document.

3. The method of claim 1 wherein the meta-data includes operational mode meta-data that does affect presentation of the document when the meta-data is processed.

* * * * *